Feb. 23, 1965 K. J. FEWEL ETAL 3,170,533
VEHICLE WITH PNEUMATIC SUPPORT
Filed July 5, 1963 6 Sheets-Sheet 1

KENNETH J. FEWEL
GENE P. SCHELL
BYRON R. WINBORN
INVENTORS

BY *J.H.C. Goldwire*

AGENT

Feb. 23, 1965 K. J. FEWEL ETAL 3,170,533
VEHICLE WITH PNEUMATIC SUPPORT
Filed July 5, 1963 6 Sheets-Sheet 2

KENNETH J. FEWEL
GENE P. SCHELL
BYRON R. WINBORN
INVENTORS.

BY H.C. Goldwire
AGENT

KENNETH J. FEWEL
GENE P. SCHELL
BYRON R. WINBORN
INVENTORS

AGENT

KENNETH J. FEWEL
GENE P. SCHELL
BYRON R. WINBORN
INVENTORS.

BY H.C. Goldwire
AGENT

KENNETH J. FEWEL
GENE P. SCHELL
BYRON R. WINBORN
INVENTORS

BY *H.C. Goldwire*

AGENT

United States Patent Office 3,170,533
Patented Feb. 23, 1965

3,170,533
VEHICLE WITH PNEUMATIC SUPPORT
Kenneth J. Fewel, Arlington, and Gene P. Schell and Byron R. Winborn, Irving, Tex., assignors to Ling-Temco-Vought, Inc., Dallas, Tex., a corporation of Delaware
Filed July 5, 1963, Ser. No. 292,984
21 Claims. (Cl. 180—9.2)

This invention relates to a continuous track vehicle and more particularly to a vehicle with pneumatic support.

The accommodation of vehicles to various types of terrain encountered in exploration of or in travel through undeveloped areas in general is difficult because of the wide variety of environments encountered. Amphibious vehicles, swamp buggies, and crawlers of various types are known. The present invention is directed to improvements over such vehicles and specifically to a vehicle with support by pneumatic cushions between the vehicle and its endless, belt-like treads.

It is an object of the present invention to provide a vehicle having a pneumatic tread in which the tread itself is in supporting relation to the vehicle and spaced from the same by a pneumatic chamber. It is a further object of the invention to provide a construction in an endless, belt-like tread having inflated cells and a lower-surface bearing course extending between wheels or rollers wherein localized distortions which may occur in the bearing course are accompanied by no more than quite small pressure gradients between cells of the tread. Another object is to provide for damping to prevent or minimize bounding of the vehicle. A still further object is to provide for the replacement of air lost in consequence of the puncture of any given cell. Yet another object of the invention is to provide for isolation of a given cell when air loss exceeds a predetermined rate.

For a more complete understanding of the present invention and for further objects and advantages thereof, reference may now be had to the following description taken in conjunction with the accompanying drawing in which.

Figure 2:
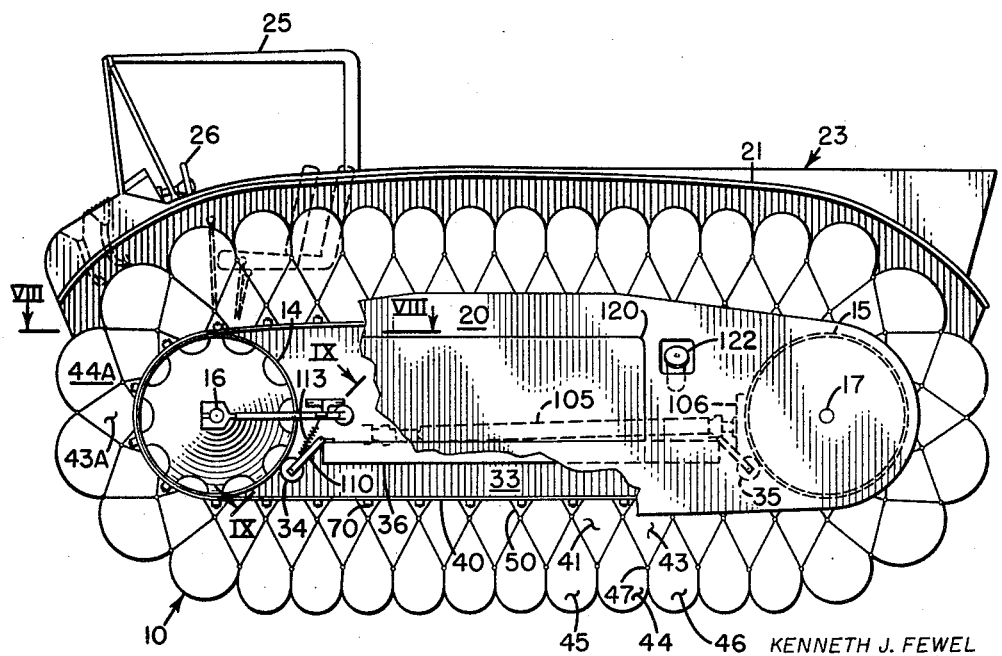
FIGURE 2 is a left side view of the vehicle of FIGURE 1 with the skirt partially removed.
Figure 14:
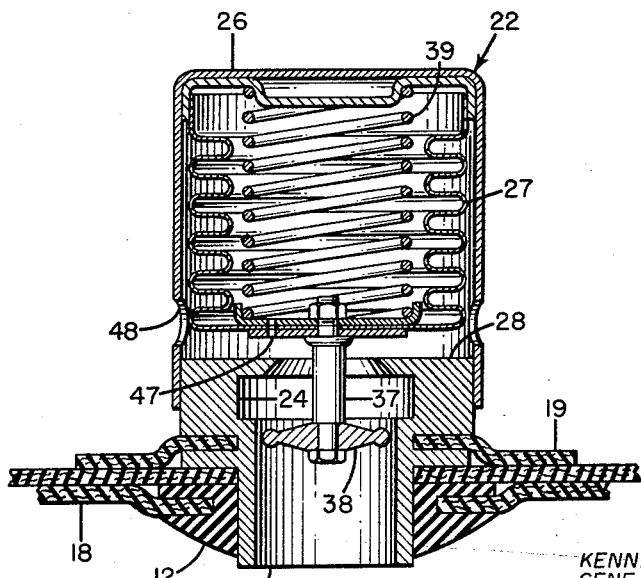
Figure 4:
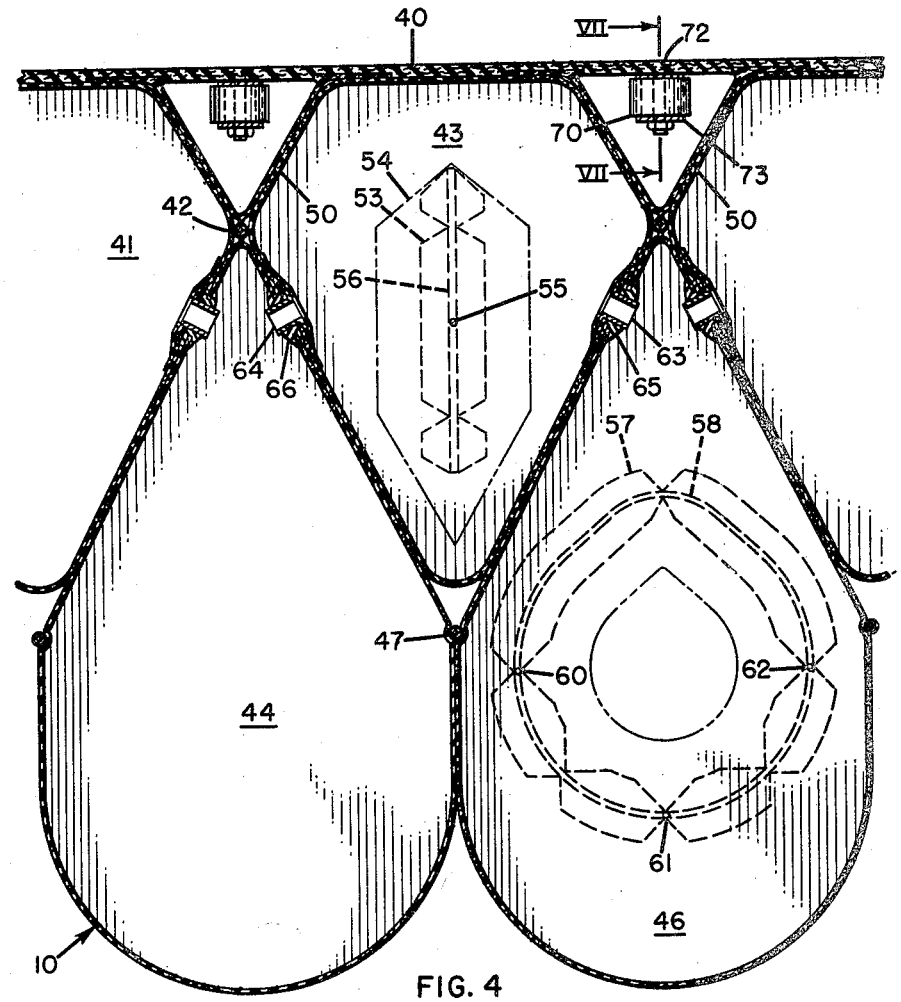
FIGURE 4 is a detailed sectional view of a portion of a tread.
Figure 5:
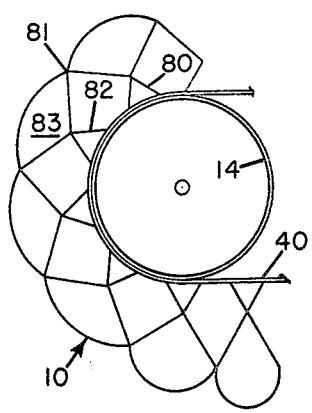
Figure 6:
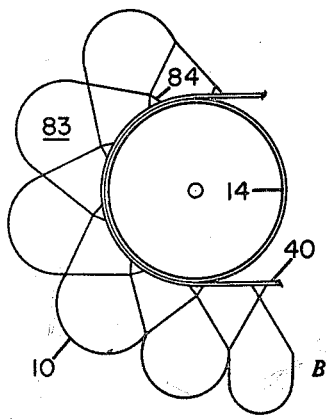
Figure 7:
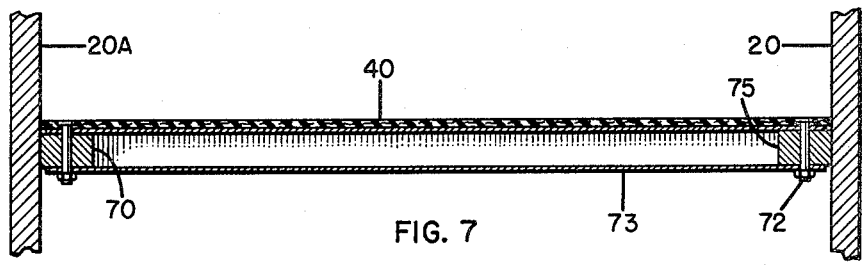
Figure 8:
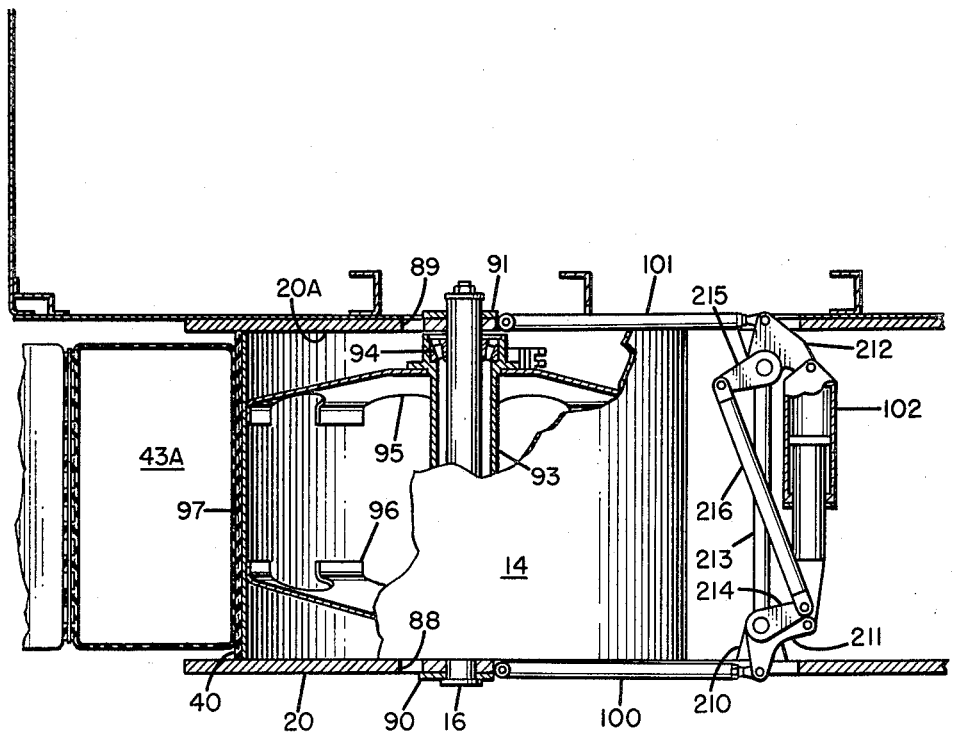
Figure 9:
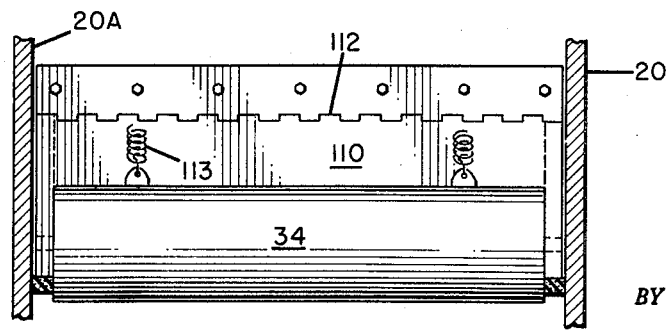
Figure 10:
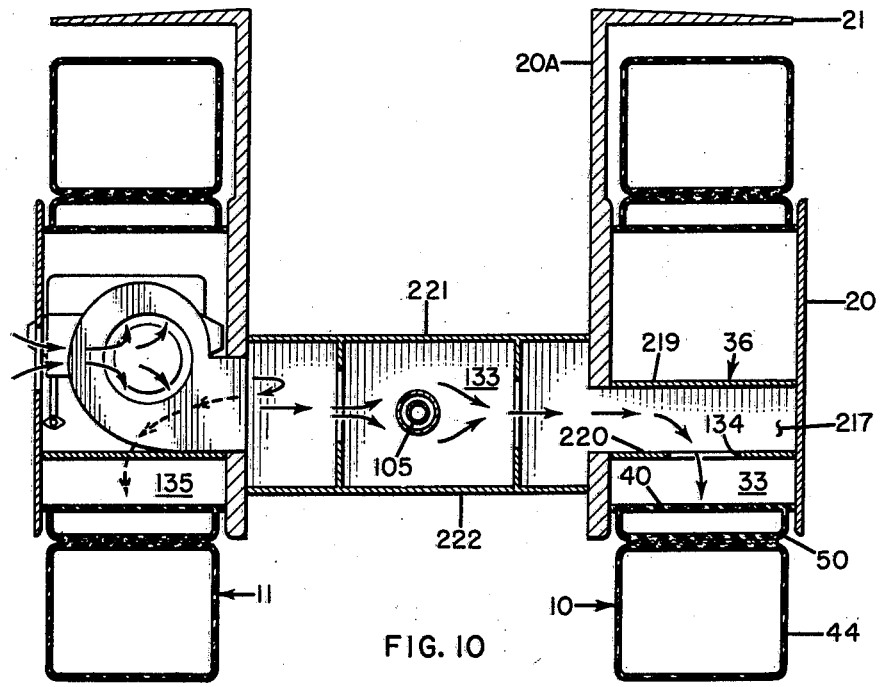
Figure 11:
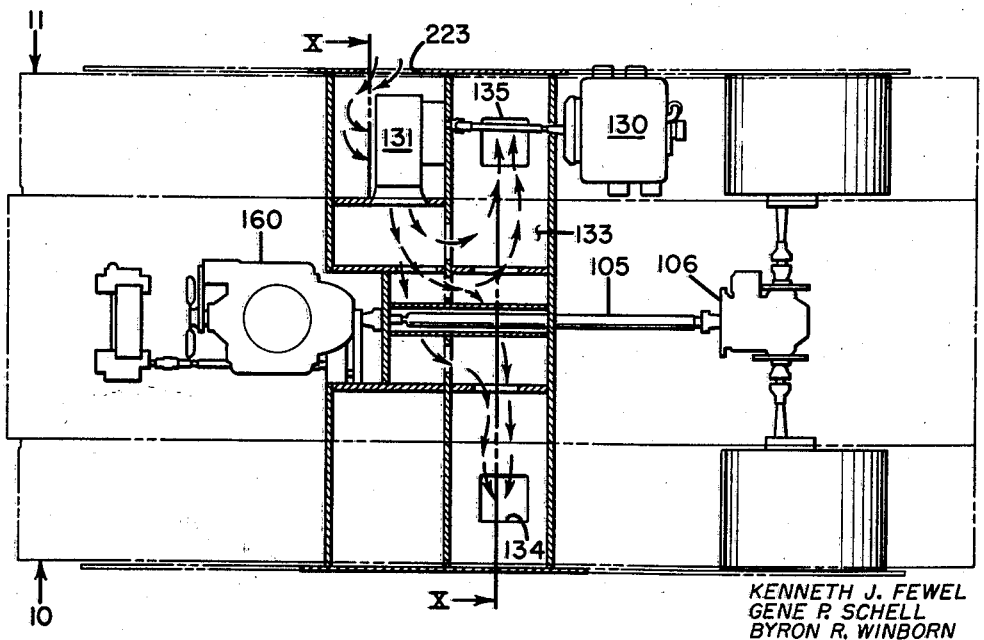
Figure 12:
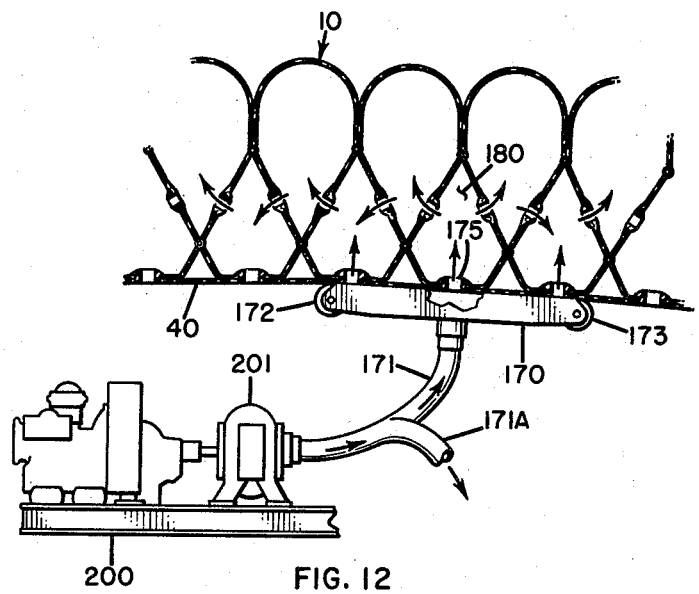
Figure 13:
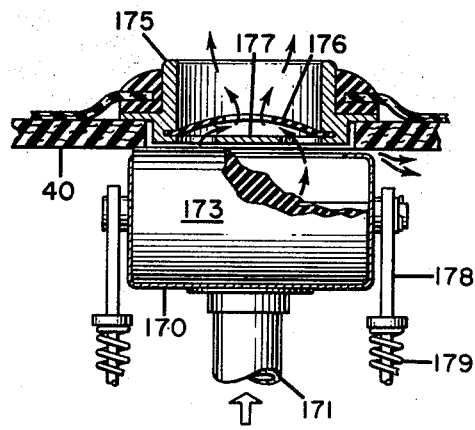

FIGURES 5 and 6 diagrammatically illustrate the effects of variations in tread geometry;

FIGURE 7 is a fragmentary sectional view taken along line VII—VII of FIGURE 4;

FIGURE 8, partially in section, is a top view of a front wheel and its support taken as at line VIII—VIII of FIGURE 2;

FIGURE 9 is a view, partially in section, taken along line IX—IX of FIGURE 2;

FIGURE 10 diagrammatically illustrates plenum air distribution as at a section taken along line X—X of FIGURE 11;

FIGURE 11 is a schematic, top, sectional view showing the tread air flow pattern;

FIGURE 12 is a diagrammatic view of a tread air replenishment system;

FIGURE 13 is an enlarged, sectional view of the tread air replenishment valve; and FIGURE 14 is a semi-diagrammatic, sectional view of a form of the cell isolating means.

The present invention is directed to a vehicle, a tread system, and a drive therefor to provide pneumatic support for a vehicle which is free from many of the undesirable characteristics of prior art vehicles. The vehicle may operate in swamps, marine areas, tundra, muskeg, and other environments encountered throughout the world. The invention will be described in connection with one embodiment which is characterized by a plenum air supported, multi-cell, tread-driven vehicle suitable for transport of cargo or personnel over areas lacking in the ordinary improvements known in the land or transport field.

Figure 1:
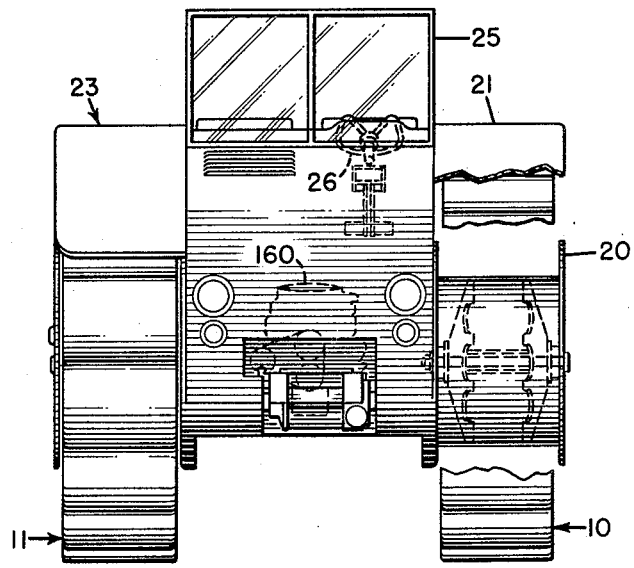
FIGURE 1 is a front view of an embodiment of the present invention.
Figure 3:
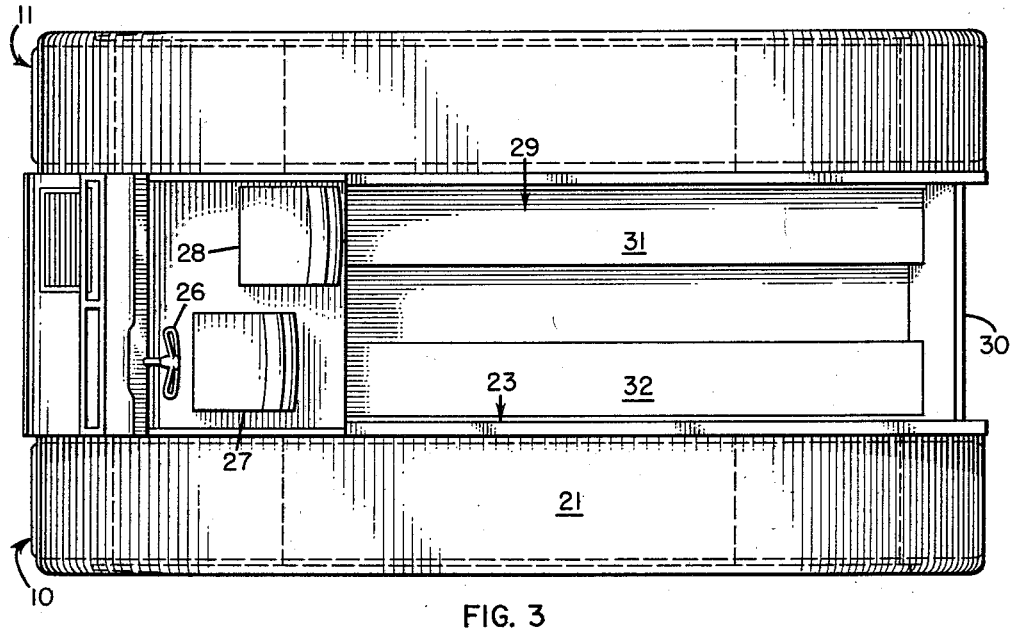
FIGURE 3 is a top view of the vehicle of FIGURES 1 and 2.

The unit shown in FIGURES 1–3 is characterized by endless treads 10 and 11 which extend along the sides of the vehicle and which are characterized by bulky, multi-cell, laterally extending chambers. The chambers are low-pressure units which cushion the vehicle and envelope obstacles over which the vehicle travels. As seen in FIGURE 2, the lefthand tread 10 is supported by a pair of wheels 14 and 15 mounted for rotation on axles 16 and 17 respectively. Axles 16 and 17 are journaled in a frame 23 comprising an elongated, oval-shaped side skirt 20 and a fender 21 extending over the upper course of the tread 10.

As shown in FIGURE 3, the frame 23 has a central, cargo-carrying bay 29. A drive engine 160 (FIGURE 1) is positioned at the front below the floor of a cab 25. The usual vehicle controls are provided, including a steering wheel 26. Included are a forward-facing driver's seat 27 (FIGURE 3) and passenger's seat 28. The cargo space 29 is closed by a hinged tail gate 30 to form a compartment suitable for varied uses. As illustrated, the vehicle is fitted for carrying personnel by the inclusion of benches 31 and 32.

It is evident from FIGURE 3 that a substantial portion of the area covered by the vehicle is occupied by the tread system. Treads of such area provide extensive ground contact along the entire length of the lower course thereof, and the load per unit area at any point along the contact surface is thus maintained at a minimum. Low-pressure cells with provision for limited interchange of air between cells, as will be described, permit operation over rough terrain with minimum vertical movement of the body; further, the low cell pressure permits travel over objects with reduced vulnerability to puncture. Most courses over natural hazards may be negotiated without damage to the cell system.

Tread 10 (FIGURE 2) includes a plurality of transverse cells mounted on an endless belt 40 which passes over roller-like wheels 14 and 15 that serve as pulleys and have cylindrical surfaces for support of the continuous tread 10. The vehicle is supported on tread 10, along the lower course of the latter extending between wheels 14 and 15, by air maintained under pressure in a downwardly facing plenum chamber 33 substantially closed at the bottom by the belt 40 and at the ends by wheels 14, 15 and suitable variable closures 34 and 35. As will be seen, the plenum top wall or bulkhead 36 is secured to the frame 23 so that primary support of the vehicle is by way of an air cushion maintained in the plenum 33. The two layers of cells on the belt 40 and the plenum chamber 33 together provide three stages of pneumatic cushions effective in support of the weight of the vehicle.

The flexible belt 40 (FIGURES 2 and 4) is of a width corresponding to the width of wheels 14 and 15; of length adequate to encompass the wheels 14 and 15, the belt has two layers of transversely extending cells secured thereto. A first or inner set of cells, such as the cells 41 and 43, are positioned on the periphery or face of belt 40. Cells 41 and 43 of the inner layer are five-sided tubes with parallel, planar ends. Inner cell 41, for example, has one side wall contiguous to a side wall of the adjacent cell 44 in an outer layer of pneumatic cells. Inner cell 43 and outer cell 44 similarly have contiguous walls. Outer cells 45 and 46 are immediately adjacent to outer cell 44.

Additional inner and outer cells are disposed over the entire length of the belt 40. Contiguous outer cells, for example the outer cells 44 and 46, are hinged together as by a hinge pin 47 at their common juncture. Each outer cell, for example cell 44, is secured to a respective belt cleat, described below, by a hinge pin 42.

The flexible construction of the cells and their geometry provide for passage of the tread 10 around wheels 14 and 15 with a minimum change of volume even though it is necessary that their shape be substantially altered. The transition from a straight course to an arcuate course defined by the wheel periphery is smooth, thus minimizing loadings induced by centrifugal accelerations and abrupt variations of internal pressure during the transition.

Referring now to FIGURE 4, belt 40 is a fabric-reinforced, rubber-covered transmission belt of well-known construction. As mentioned, the cells of the outer layer are fastened to belt 40 by means of cleats such as the cleat 50. Each cleat 50 is made of rubber reinforced with cord or fabric and vulcanized to the surface of the belt 40 to form a structure of triangular cross-section and extending the width of the belt. To attach it to a respective cleat 50, each cell 44 is provided, at its juncture with the cleat, with a rib formed in the manner of a piano hinge half. A similar rib is formed on the cleat 50 and the two ribs are locked together by the hinge rod 42, which preferably is made of a tough, flexible material such as nylon. Cells 45 and 46 are similarly coupled together by the hinge pin or rod 47.

Reinforcing fabric layers 53 and 54 are vulcanized into place on each end of each inner cell as shown in cell 43; sandwiched between the fabric layers are stays such as stay 56. The stays 56 at each end of each inner cell are connected at their centers by a cable 55, preferably made of steel, which minimizes ballooning of the inner cell such as 43 at its ends. Similarly, the ends of each outer cell such as 46 are covered with superimposed layers of reinforcing fabric 57 vulcanized in place and containing between them an annular stay 58. Preferably three cables 60, 61, 62 extend between and connect the stays 58 in each end of each outer cell such as 46 to prevent ballooning of the cell end walls. For convenience of illustration, the stays of only the inner cell 43 and outer cell 46 have been illustrated.

The walls of cells 44 and 46 are each of conventional, reinforced rubber sheet formed and vulcanized into the shapes indicated in the drawing. Built-up exterior surface configurations may be provided on the exterior surfaces of the outer cells such as cell 46 to enhance traction, in sand, snow, water, or the like.

As shown in FIGURE 4, provisions are included for damping and minimizing the bounding which heretofore has characterized large, pneumatically supported vehicles. Inner cell 43 includes a pair of short, flanged tubes 63 and 64, the flanges on the tubes being vulcanized to the walls of cell 43. Cell 46 is provided with a reinforced orifice structure 65 which sealingly mates with the exterior wall surface of tube 63. Similarly, tube 64 is encompassed by and sealed to the wall of a reinforced orifice structure 66 in the wall of cell 44. The passages thus formed interconnect the adjacent, interleaved cells 43, 44, and 46 and serve not only to provide for interchange of air but also to anchor the inner-layer cell 43 in its desired position. Thus, air may flow through the cell system in a path which alternately includes an inner cell and an outer cell. Such coupling, which may provide for intercommunication and air exchange throughout the entire tread, permits an outer cell to envelope an object without assuming a disproportionate share of the load and without any great internal pressure increase. At the same time, forces applied to the tread which otherwise would cause bounding are damped by air flow from one cell to another. The cell sysem thus forms a series-type manifold in which air flows serially from one cell to another. The series coupling, illustrated in FIGURE 4, is preferable because it can be housed completely within the tread and requires a minimum of structure; it will be appreciated, however, that a parallel manifolding system alternatively may be employed for interchange of air between the cells. The opening formed by each orifice structure tube such as 63 is large enough to minimize shocks to the vehicle by permitting an adequate airflow between cells when an outer cell rapidly passes onto and engulfs a large object but small enough to prevent substantially free airflow between cells and thus to damp out the long-period bounding of the vehicle which otherwise could occur.

The three-stag suspension provided by the plenum and by the two layers of cells results in advantages including smooth, shock-free riding qualities and uniform distribution of ground loading forces. Not only an outer cell is deformable upon impinging upon and engulfing an object; one or more inner cells are compressible, and the belt 40 is deflectable into the plenum chamber in response to the locally imposed increase in load. Because of the mechanical and fluid connections between them, moreover, this local increase in load is widely distributed, with the result that ground loading, from cell to cell, is quite uniform.

It has been found desirable to limit the flow coupling, as represented by tubes 64, 66, to a limited number of compartments formed by sub-groups of cells. For example, from five to seven cells may be operated as a single, interconnected unit or multi-cell chamber. At two or more places, the ports in adjacent walls forming the boundary between one multi-cell chamber and the next are omitted or closed to prevent air interchange; thus, the orifice between any pair of cells may be stopped or omitted to subdivide the tread 10 at any point. Such sub-grouping of cells provides a measure of control over the period of oscillation of the suspension and permits continuous, though limited, operation even though cells of a given sub-group are damaged by severe rupture. With the cells divided into sub-groups, the entire track will not be deflated in the event of a leak or even a severe rupture that requires the vehicle to be stopped and a cell or cells replaced. If all cells became deflated, the vehicle would develop a severe list, and it will be appreciated that cell replacement is much easier where, as with sub-grouping of cells, the vehicle may be rolled to a position in which it is held level by normally functioning cells and in which the cell to be replaced lies readily accessible in the upper course of the track.

In a preferred embodiment of the invention, the cleats 50 and the inner and outer cells such as cells 43, 44 are of such dimensions that there is a minimum change in volume of any of the cells in passing from a straight course to the arcuate courses around the supporting wheels. The effect of variations in relative dimensions of the cleats and the cells is readily apparent from inspection of FIGURES 2, 5, and 6.

In FIGURE 5, it will be noted that relatively large cleats such as 80 and 82 are secured to the belt 40. With cleats of this size, the ratio of the radius of the outer-cell hinge point 81 to the radius of the peaks of cleats 80 and 82 is relatively small. As a result, outer cell 83 is radically deformed in passing around the wheel 14, and a substantial decrease in the volume is experienced in outer cell 83.

In FIGURE 6, the cleats 84, pinned to the cells such as 83 in the outer layer, are very small. As a result, when the belt 40 passes over wheel 14, the outer cell 83 increases in volume.

A substantially zero change in cell unit volume as the cells pass from a straight to an arcuate course is desired to prevent fluctuations in cell interior pressure and to eliminate unnecessary airflows between cells. Besides cleat height, mentioned above, four other factors influence cell unit volume variation when changing from a straight to an arcuate course. These are: wheel diameter; the spacing between cleats; the spacing between the inner and outer hinge pins; and the distance along the periphery of each outer cell from one to the other of its outer hinge pins. If the value of one of these factors is changed, a corresponding and compensating alteration must be made in one or more of the other factors. It is not possible to provide a statement of specific proportions between the factors named which will cover all of the multitudinous combinations possible; it is definitely the case, however, that the relations between the factors named must be such as to produce substantially a zero change in volume as a cell unit (an inner cell and adjoining outer cell) passes on or off a wheel. This statement will suffice, for once made aware of it, one versed in the art will readily effect the geometrical manipulations necessary to designation of the correct dimensions, as to the above-named factors, in a vehicle of a given size. A specific example is readily provided, however; in this, with a cleat altitude of 4 inches, the spacing between the apexes of adjoining cleats is 11 inches and the circumference of the wheels is approximately 55 inches, or the length occupied by ten cleats. The distance from an inner hinge pin 42 (FIGURE 4) to an adjoining outer hinge pin 47 is 12 inches. The distance between one and the other outer hinge 47 of an outer cell, measured along the outer portion of the cell periphery, is 26.5 inches. While many variations of the dimensions are possible and feasible, the correct result will not be obtained unless the volume of a cell unit remains, for practical purposes, the same when changing from a straight to an arcuate course. Thus, in FIGURE 2, the sum of the cross-sectional areas of inner cell 43A and outer cell 44A is the same as the sum of the cross-sectional areas of inner cell 43 and outer cell 46. It will be understood that the two wheels 14, 15 are of the same dimensions, and similar uniformity exists between the cleats, inner cells, and outer cells.

In FIGURES 2 and 4, a roller is positioned inside each cleat such as 50 at the outboard side of belt 40. A similar roller (not shown in the sectional view) is employed on the inboard side of belt 40. Each roller 70 is mounted on a short bolt 72, the head of which is secured to the belt 40 and which passes through a wall of a rigid, rectangular tube 73 which extends the width of the belt 40. As shown in FIGURE 7, the second roller 75 is mounted at the opposite end of tube 73. Rectanugular tube 73 provides for lateral support so that the rollers will transfer to the frame members 20, 20A lateral forces exerted upon the tread 10 during maneuvers, Rollers, such as rollers 70 and 75, are provided in each of the cleats on the belt 40 as shown in FIGURE 2.

The belt 40 is maintained under tension by a resilient support for the front wheel 14, shown in FIGURE 8. The axle 16 for wheel 14 is a tubular stub shaft mounted at its outboard end on a slide block 90 in turn mounted in a slot 88 in the skirt 20. A similar slide block 91 operates in slot 89 for mounting the inboard end of the shaft 16. The wheel 14 is provided with a hollow cylindrical shaft 93 which is mounted on shaft 16 by bearings 94. The wheel 14 includes a pair of dished plates 95 and 96 secured to suitable hubs on shaft 93 and further secured at their outer peripheries, as by welding, to the wheel cylinder 97, the latter being of width corresponding to the width of the belt 40. The width of the air cells mounted on belt 40 is slightly less than the width of the belt to maintain clearance between the ends of the cells and the outboard and inboard frame members 20 and 20A respectively. The slide supports 90 and 91 are provided with rearwardly extending arms or rods 100 and 101 coupled together by a linkage which is actuated by an actuator 102 to force forwardly the stub shaft 16 of wheel 14. An outboard bracket 210 mounted on the outer frame member or skirt 20 pivotally mounts a bell crank 211 one of whose free arms is connected to the slider block rod 100 and the other free end of which is connected to the piston rod of the actuator 102. The other end of the actuator 102 is connected to one arm of another bell crank 212 similarly mounted on the inboard frame member 20A and having another arm connected to the inboard slider block rod 101. A brace rod 213 interconnects the brackets 211, 212. The pivot pins or shafts of the bell cranks 211, 212 mount, in rigid relation to each respective bell crank, a pair of arms 214, 215 whose free ends, one extending rearwardly and the other forwardly, are connected by a rod 216. Hydraulic fluid is admitted under pressure into the cylinder of actuator 102 through a suitable conduit or conduits (not shown); extension of the actuator 102 rotates the bell cranks 211, 212 in a direction producing forward motion of the slider blocks 90, 91. Connection of the bell cranks 211, 212 through the rod 216 and related arms 214, 215 ensures concurrent, equal rotation of both bell cranks. The fluid pressure in the cylinder of actuator 102 is so controlled as to maintain a desired tension on the belt 40, the control being effected by any conventional, desired means. It will be understood that similar front wheel mounting means and belt tensioning means are employed on both sides of the vehicle.

The slide support 90, the rod 100, and the linkage for the actuator 102 are shown in side view in FIGURE 2. It will be noted that the edge of the disk 96 adjacent the cylinder 97 has perforations which leave spoke-like supports for the cylinder 97. The forward wheel 14, as mounted on the stub shaft 16, serves as an idler pulley variably positioned to maintain the belt 40 under tension. In contrast, the axle 17 on which the wheel 15 is mounted is a drive axle, driving power being provided by the engine 160 (FIGURE 1). A drive shaft 105, shown in broken line in FIGURE 2, extends to a transmission 106 for driving the rear axles 17.

As previously mentioned, the air plenum chamber 33 is closed at its top by the plate 36, at its bottom by the belt 40, and at its sides by the skirt 20 and the corresponding inboard frame member 20A, the chamber ends being closed by cylinders 34 and 35 forming part of variable closure couplings to the respective wheels 14 and 15. As best seen in FIGURE 2, the cylinder 34 is mounted on an arm 110 which is hinged to an edge of the plenum plate 36; the rear cylinder 35 is similarly mounted. As shown in the detailed view provided in FIGURE 9, the arm 110 is plate-like between the extremities of the cylinder 34, which preferably is rubber-coated in order to maintain a seal with the surface of the wheel 14. A piano-hinge type coupling 112 serves to link the plate-like arm 110 to the frame member 36. A spring 113 (FIGURE 2) is connected between the arm 110 and any fixed structure (not shown) of the frame to urge the cylinder 34 into contact with the wheel 14. Air maintained under pressure in the plenum 33 aids in the maintenance of the seal between the cylinders 34, 35 and the wheels 14, 15.

The track, constructed and related to the plenum chamber as described, offers important advantages in operation over debris-strewn, dusty, or muddy ground or over snow or ice. The positive plenum pressure, the downwardly facing orientation oft he plenum chamber, and the close tolerance between the belt and the chamber walls combine to keep foreign material out of the plenum chamber. Encrusted mud, snow, etc. is flaked off the tread as it changes shape in passing over the wheels; hence, the tread is efficient in self-cleaning. In the lower course, the outer cells press against each other to resist the entry of materials between them, and such matter as does enter is stopped at the lower hinge pins and ejected upon passage over a wheel.

As shown in FIGURE 2, a door 120 is formed in the skirt 20 to provide access into a storage compartment provided inside the track 10. A fuel tank, not shown but located inside the tread 10, has a filler neck 122 extending into a pocket in the skirt 20.

As shown diagrammatically in FIGURE 10, the lefthand plenum upper bulkhead 36 includes spaced, upper and lower faces 219, 220 which, in cooperation with the skirt 20, enclose a chamber 217 opening through a port 134 into the left-hand plenum chamber 33. A similar chamber will be seen to be enclosed by the right-hand plenum plate upper and lower faces and to open through a similar port into the right-hand plenum 135. The plates 219, 220 serve as structural members which interconnect the skirt 20 and inboard frame member 20A at the left-hand side of the vehicle, a similar construction being employed at the right-hand side. Meanwhile, structural connection between the left-hand inboard frame member 20A and the corresponding right-hand member is effected by a central platform or beam 132 with spaced, air tight upper and lower plate or faces 221, 222 which form an airtight passage 133 connecting with the plenum plate passages such as the left-hand passage 217. Close contact or adjacency of the edges of belt 40 to inboard and frame members 20, 20A permits air to be maintained under pressure in plenum 33, and similarly in plenum 135, for support of the vehicle. Drive shaft 105 conveniently is routed through the platform passage 133. The platform upper plate 221 forms the floor of the cargo bay 29 (FIGURE 3). It will be noted that the outlet of the blower 131 is sealingly connected into an opening leading to the platform passage 133.

FIGURE 11 diagrammatically shows another view of the plenum air distribution system. Motor 130 is coupled to blower 131, located in a compartment supplied with blower air by a frame opening 223, the blower output being directed into platform passage 133 and the latter being connected into the plenums through plenum plate openings 134, 135. As to the track drive system, engine 160 is shown as connected to transmission 106 by drive shaft 105. The plenum air distribution system above described provides relatively low pressure air for the support of the vehicle.

FIGURES 12 and 13 illustrate a system driven from a second air blower 201 mounted on any desired fixed structure 200 of the vehicle for providing replacement air, preferably at several times the pressure of the air from the plenum blower 131, to the cells of the tread. As shown in FIGURE 12, a relatively small plenum chamber 170 is supplied with air by duct 171 leading from the blower 201 and branching at 171A to a similar plenum (not shown) on the other side of the vehicle. The upper course of the belt 40 passes over the open upper surface of the plenum chamber 170, the ends of which are closed by rollers 172 and 173 which roll upon the inner surface of the belt 40. The belt 40 is provided with internally directed, diaphragm-stopped ports, one port leading into each of the cells in the first layer of cells. The ports may be of the type illustrated in FIGURE 13 wherein a short cylinder 175 is secured in the belt 40 to provide an orifice through the belt. A centrally pierced, flexible diaphragm 176 permits the flow of air through a peripherally perforated disk 177, both the diaphragm and disc being mounted in the bottom of the cylinder 175, in combination with which they form a differential valve means for admitting air into the cells through the belt and for preventing airflow out of the cells through the belt. Air from the plenum 170 may pass upward through the disk 177 and through the diaphragm 176 into cell 180 of FIGURE 12. If any cell which is connected to cell 180 is punctured and loses air, the cell will receive replenishing air from plenum 170 within each cycle of the tread. The plenum 170 is maintained in contact with the lower surface of the belt along its upper course by means of arms 178, which arms are resiliently supported by springs 179 mounted on any convenient fixed structure of the frame 23 of the vehicle.

Where desired, there is provided means for isolation of a given cell, cell unit, or cell group upon loss of air at an excessive rate, thus avoiding air loss from adjoining cells and excessive loading on the air replenishing system. The isolating means is employed as a modification and in the place of all or part of the intercell orifice structures such as 63, 65 (FIGURE 4). Any suitable, so-called "air fuse" or equivalent device may be employed between adjoining cells, a number of such devices being generally known; and a schematic representation of one form of isolation device is shown in FIGURE 14. A grommet 12 set into the wall 18 of, for example, an inner cell receives the tubular end 13 of a valve 22 affixed in an opening in an outer cell wall 19, above which the valve tubular portion 13 is increased in diameter to form a cylindrical casing 24 terminating in an end wall 26 on which is mounted a bellows 27 or equivalent device whose free end faces and is separated from the open, tubular end 13 by a partition 28 having a central opening. A rod 37 mounted on the bellows free end extends through the opening of the wall 28 and carries a plunger 38; and a spring 39 biases the bellows 27 to an expanded position in which the plunger 38 lies within the smaller-diameter tubular portion 13, which is of slightly greater diameter than the plunger, the case 24 being of still greater diameter. A bleed opening 47 in the bellows free end opens into the case 24, and the latter opens into the outer cell, formed by wall 19, through openings 48. The annular gap between the plunger 38 and tubular end portion 13 is large enough to permit inter-cell airflow sufficient to reduce and damp bouncing of the vehicle upon a cell suddenly rolling onto and hence engulfing a large object and small enough to prevent a virtually free inter-cell air exchange which could result in long-period bounding of the vehicle. Movements of the plunger 38 accompanying airflows of the amplitude and duration occasioned by shocks resulting from terrain contacts in travel of the vehicle are resisted by the air pressure changes in the bellows 27 accompanying plunger movements, and the plunger 38 hence remains in the valve tubular end portion 13. An unusually high-rate flow may force the plunger 38 into the larger-diameter casing 24, whereupon further travel of the plunger is stopped by the increased gap between its edge and the casing and by continued resistance provided by the bellows 27. If the outer cell or chamber formed by the wall 19 is extensively ruptured, however, the airflow through the valve 22 which follows is of sufficiently high rate and duration to allow time for the bleeding of resisting air pressure from the bellows through the bleed opening 47 and seating of the plunger 38 in the opening of wall 28. Once seated, the plunger 38 is held in place by the pressure gradient between its faces, and the chamber formed by wall 19 is isolated from the still-inflated inner chamber formed by wall 18.

The foregoing description of one embodiment of the present invention relates to a relatively small transport designed for carrying a driver and passenger in the cab and ten men in the cargo bay. By way of illustration only, the overall length is of the order of 17 feet, the height is 7½ feet to the top of the fender, and the width is about 9 feet. The cells operate at an internal pressure of approximately 2.0 pounds per square inch. The pressure applied to the ground through the treads is about 1.2 pounds per square inch, and the plenum pressure is maintained at about 1.0 pound per square inch. The clearance from the ground to the bottom of the platform 132 is slightly in excess of 2 feet. The vehicle, when operating in water, submerges to a water line the level of which depends on the load carried but preferably is at the bottom of the platform 132. While the wheel disks are shown pierced near the edges, they may be made solid, thus permitting sealing of the wheels 14, 15 for increased buoyancy.

While only one embodiment of the invention, together with possible modifications thereof, has been described in detail herein and shown in the accompanying drawing, it will be evident that various further modifications are possible in the arrangement and construction of its components without departing from the scope of the invention.

We claim:
1. In a continuous-tread, propelled vehicle, the combination which comprises:
longitudinally aligned wheels, one of which may be driven;
an endless belt on said wheels;
structure secured to said belt forming at least one layer of pneumatic chambers;
a downfacing channel between said wheels encompassing the margins of said belt and portions of the ends of said chambers; and
means for maintaining the interior of said channel above said belt under positive air pressure, said belt being movable perpendicularly to a lower tangent to said wheels and between said lower tangent and locations thereabove in said downfacing channel.

2. The combination of claim 1 and further comprising means maintaining air pressure in said pneumatic chambers at a higher value than in said downfacing channel.

3. In a continuous-tread, propelled vehicle, the combination comprising:
longitudinally aligned wheels, at least one of which may be driven;
an endless belt mounted on said wheels, said belt having an inner face contacting said wheels and an outer face;
a plurality of flexible pneumatic chambers attached to the belt outer face and forming at least one layer covering the same;
a downfacing channel between the wheels encompassing the margins of the belt and portions of the chambers, said channel having an upper wall; and
means for maintaining a positive air pressure in the channel between the upper wall and the belt, said belt being movable perpendicularly to a lower tangent to said wheels and between said lower tangent and locations thereabove in said downfacing channel.

4. In a crawler-type vehicle, the combination which comprises:
a pair of longitudinally spaced cylindrical wheels on each side of said vehicle;
belt means linking each said pair of wheels and having a lower course between said wheels;
structure secured to each of said belt means forming at least one layer of pneumatic chambers;
an open, downfacing plenum chamber extending between each pair of said wheels and encompassing the lower course of said belt means for travel through said chamber by said belt means; and
means for maintaining positive air pressure in said plenum chamber for pneumatic support of said vehicle above the lower course of said belt means, each of said belt means being movable perpendicularly to a lower tangent to a respective pair of said wheels and between said lower tangent and locations thereabove in a respective one of said plenum chambers.

5. Means for pneumatic support of a tracked vehicle comprising:
longitudinally aligned wheels mounted at the front and rear of said vehicle;
a flexible, endless belt mounted on and having a bottom course between said wheels;
drive means for one of said wheels;
resilient means for urging the other of said wheels away from said one of said wheels to maintain said belt in tension;
an open, downfacing plenum chamber having sides which intimately confront the edges of said belt along the bottom course thereof;
movably mounted end members for said plenum chamber having means for engaging said wheels; and
means for maintaining air under positive pressure within said plenum chamber above the bottom course of said belt for pneumatic support of said vehicle above said belt.

6. Pneumatic support means for a vehicle propelled by endless belt means which is mounted on front and rear wheels and which has a lower course between said wheels, said means comprising:
flexible structure forming a first layer of transverse air chambers each extending substantially the width of said belt means;
flexible structure forming a second layer of transverse air chambers secured to said belt means between the chambers of said first layer and bearing against the chambers of the first layer for forcing the latter against the belt means;
an open, downfacing plenum structure having an upper wall spaced above a lower tangent to said wheels and downwardly extending sides for engaging opposite edges of said belt means for maintaining at a minimum the clearance between said sides and said edges; and
means for maintaining air under pressure between said plenum structure and the bottom course of said belt means for pneumatic support of said vehicle above said belt means.

7. The combination set forth in claim 6 in which a cross-stay means extends through the interior and between the ends of each said chamber.

8. The combination set forth in claim 6 in which each chamber in said first layer is of doubly truncated triangular cross-section with one side thereof contiguous to said belt.

9. The combination set forth in claim 6 in which the chambers in said first layer are of doubly truncated triangular cross-section with one side thereof contiguous to said belt and the other two sides each contiguous to one of a pair of adjacent chambers in said second layer.

10. The combination set forth in claim 6 in which each chamber of said second layer has two side walls contiguous with side walls of chambers in said first layer and an arcuate, outer tread face.

11. The combination set forth in claim 6 in which each chamber in said first layer is of doubly truncated isosceles triangular cross-section with the base thereof contiguous to said belt and in which each chamber in the second layer has two side walls contiguous with side walls of chambers in said first layer and an arcuate, outer tread face.

12. Pneumatic support means for a vehicle propelled by endless belt means which is mounted on front and rear wheels and which has a lower course between said wheels, said means comprising:
flexible structure forming a first layer of transverse air chambers each extending substantially the width of said belt means;
flexible structure forming a second layer of transverse air chambers secured to said belt means between the chambers of said first layer and bearing against the chambers of the first layer for forcing the latter against the belt means;
an open, downfacing plenum structure having an upper wall spaced above a lower tangent to said wheels and downwardly extending sides for engaging opposite edges of said belt means for maintaining at a minimum the clearance between said sides and said edges;
means for maintaining air under pressure between said plenum structure and the bottom course of said belt means for pneumatic support of said vehicle above said belt means; and
structure forming flow channels of limited flow capacity through the contiguous walls of adjacent pairs of said chambers where one chamber of each pair is in said first layer and one is in said second layer.

13. The combination set forth in claim 12 wherein said structure forming flow channels of limited flow capacity interconnects said cells to form a plurality of separate groups of said cells.

14. The combination set forth in claim 12, wherein said structure forming flow channels of limited flow capacity interconnects adjoining ones of said chambers in isolated groups wherein the length of any group along said belt means is less than about one-half the peripheral length of said belt means.

15. A pneumatic track for an endless-track propelled vehicle which comprises;
 a flat belt;
 resilient structures extending transversely of said belt forming an inner layer of chambers of doubly truncated triangular cross-section the bases of which are contiguous to said belt; and
 resilient structures extending transversely of said belt forming an outer layer of chambers each having a first wall contiguous to a first chamber in said inner layer and a second wall contiguous to a second chamber in said inner layer adjacent to said first chamber.

16. A vehicle propelled on a pair of endless pneumatic tracks which comprises:
 a chassis having transverse axles at one end and a pair of stub shafts at the other end;
 a pair of cylindrical wheels mounted on said axles on opposite sides of said chassis;
 a cylindrical wheel mounted on each of said stub shafts and each aligned with one of said wheels on said axles;
 means for driving said axles;
 a flexible belt encircling the wheels on each side of said chassis;
 resilient means for urging said stub shafts away from said axles independently of each other to independently tension each of said belts;
 flexible structures positioned adjacent each of said belts and forming a first layer of transverse chambers;
 flexible structures secured to each of said belts and interleaved with the chambers of said first layer to form a second layer of transverse chambers; and
 structure associated with the chambers of each belt and forming flow channels of limited flow capacity through the contiguous walls of adjacent pairs of said chambers where one chamber of each pair is in said first layer and one is in said second layer.

17. In a vehicle having spaced, cylindrical wheels and an endless belt mounted on said wheels for travelling straight upper and lower courses therebetween and a semi-circular, arcuate course over each wheel, a tread for said belt comprising:
 contiguous, flexible, inflated inner chambers forming a first layer on the belt and of doubly truncated triangular cross-section, each with its base against the belt and each having an apex, a space of isosceles triangular cross-section and extending across the belt interlying each adjacent pair of inner chambers;
 spaced, flexible cleats each attached on and having an apex spaced from the belt in a respective one of said spaces and having two walls forming equal sides of an isosceles triangle and each lying against a respective one of a respective pair of inner chambers;
 contiguous, flexible, inflated outer chambers forming an outer, second layer on the belt and each having an apex contiguous with a corresponding cleat apex and a pair of sidewalls each contiguous with a respective inner chamber and coming into contact with a sidewall of an adjoining outer chamber at a location lying outwardly of the belt from and in register with the apex of a respective inner chamber, each outer chamber thus having two or said locations of contact and further having an outer tread wall portion extending between said locations;
 inner attaching means pivotally joining each outer chamber apex to a respective cleat apex;
 outer attaching means pivotally joining each outer chamber to two adjoining outer chambers at said locations of contact,
 the spacing of the cleat apexes from the belt and each other, the wheel circumference, the spacing between neighboring inner and outer attaching means, and the distance between neighboring outer attachment means as measured along the exterior of the corresponding outer tread wall portion being of an interrelationship accompanied by a substantially zero change in the sum of the volumes of each outer chamber and an adjoining inner chamber when changing from a straight course to an arcuate course over each of the wheels.

18. In a continuous tread propelled vehicle, the combination which comprises:
 an endless track and a pair of support and drive wheels therefor;
 structure secured to said track forming a pair of interleaved layers of transverse pneumatic chambers;
 a downfacing channel between said wheels encompassing the margins of said track along a lower course thereof between said wheels for support of said vehicle;
 and supply means between said wheels contacting said track as it passes along the upper course thereof for introduction of air into said chambers as they pass said supply means.

19. In a continuous tread propelled vehicle, the combination which comprises:
 longitudinally aligned wheels one of which is driven;
 an endless track on said wheels;
 structure secured to said track forming a pair of layers of pneumatic chambers;
 differential valve means extending through said track at a plurality of longitudinally spaced points to form flow paths through said track into selected ones of said chambers;
 upfacing channel means supported between said wheels for contacting said track for successive registration with said valve means; and
 means for supplying air to said upfacing channel means at a pressure at least equal to the pressure normally to be maintained in said chambers for maintaining air in said chambers at a predetermined pressure.

20. In a continuous tread propelled vehicle, the combination which comprises:
 longitudinally aligned wheels one of which may be driven;
 an endless belt mounted on and having upper and lower courses extending between said wheels;
 structure secured to said belt forming inner and outer layers of pneumatic chambers;
 a downfacing channel between said wheels encompassing the margins of the lower courses of said belts;
 an upfacing channel between said wheels adjacent to and adapted to contact the inner face of said belt along the upper course thereof;
 a plurality of valve means mounted in said belt and spaced one from the other longitudinally along said belt in position adapted for registration with said upfacing channel, said valve means permitting flow into said chambers and preventing flow from said chambers; and
 means for maintaining air in said channels under positive pressure with the air of the upfacing channel at a pressure in excess of the pressure of the air in the downfacing channel.

21. Pneumatic support means for a vehicle propelled by endless belt means which is mounted on front and rear wheels and which has a lower course between said wheels, said means comprising:
 flexible structure forming a first layer of transverse air chambers each extending substantially the width of said belt means;
 flexible structure forming a second layer of transverse air chambers secured to said belt means between the chambers of said first layer and bearing against the chambers of the first layer for forcing the latter against the belt means;

an open, downfacing plenum structure having an upper wall spaced above a lower tangent to said wheels and downwardly extending sides for engaging opposite edges of said belt means for maintaining at a minimum the clearance between said sides and said edges;

means for maintaining air under pressure between said plenum structure and the bottom course of said belt means for pneumatic support of said vehicle above said belt means;

structure forming flow channels of limited flow capacity through the contiguous walls of adjacent pairs of said chamber where one chamber of each pair is in said first layer and one is in said second layer;

means for introducing air into the chambers of the first layer for maintaining an air pressure within said chambers of the first and second layers which is higher than the air pressure within the downfacing plenum structure; and flow-responsive valve means interposed in at least some of said flow channels through the contiguous walls of adjacent pairs of said chambers for allowing normal flow between adjacent pairs of the chambers and for cutting off flow between said chambers when the flow becomes excessive.

References Cited in the file of this patent

UNITED STATES PATENTS

| | | |
|---|---|---|
| 809,048 | Furchtbar | Jan. 2, 1906 |
| 2,713,521 | Curtis | July 19, 1955 |
| 2,900,210 | Parsons | Aug. 18, 1959 |
| 3,074,764 | Bertelsen | Jan. 22, 1963 |

UNITED STATES PATENT OFFICE
CERTIFICATE OF CORRECTION

Patent No. 3,170,533                        February 23, 1965

Kenneth J. Fewel et al.

It is hereby certified that error appears in the above numbered patent requiring correction and that the said Letters Patent should read as corrected below.

Column 4, line 14, for "three-stag" read -- three-stage --; column 6, line 60, for "oft he" read -- of the --; column 7, line 15, for "plate" read -- plates --; column 11, line 67, for "or" read -- of --.

Signed and sealed this 27th day of July 1965.

(SEAL)
Attest:

ERNEST W. SWIDER                        EDWARD J. BRENNER
Attesting Officer                           Commissioner of Patents